Inventor
Floyd Hink

Patented Nov. 29, 1949

2,489,413

UNITED STATES PATENT OFFICE 2,489,413

WHEEL REMOVER

Floyd Hink, Haigler, Nebr.

Application April 12, 1948, Serial No. 20,405

1 Claim. (Cl. 29—267)

This invention relates to new and useful improvements in which removers and the primary object of the present invention is to provide a novel and improved wheel puller that is manually actuated in a convenient manner to pull a wheel from its supporting axle.

Another important object of the present invention is to provide a wheel remover or puller including an axle engaging member, and a novel and improved flexible wheel engaging element that is twisted about the axle engaging member as the latter is rotated to effectively pull the wheel from its axle.

A further object of the present invention is to provide a wheel puller that is quickly and readily applied to a wheel and its supporting axle in a convenient manner.

A still further aim of the present invention is to provide a wheel puller for vehicles and the like that is simple and practical in construction, strong and reliable in use, small and compact in structure, relatively inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which—

Figure 1:
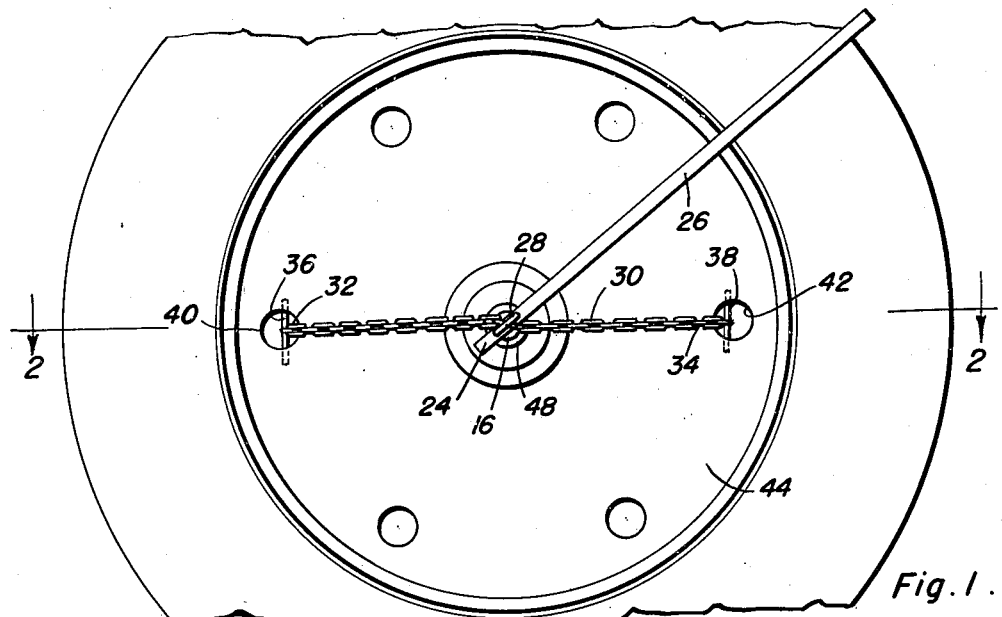
Figure 1 is a front elevational view of a wheel and wheel axle, and showing the present invention in position thereto for use.
Figure 2:
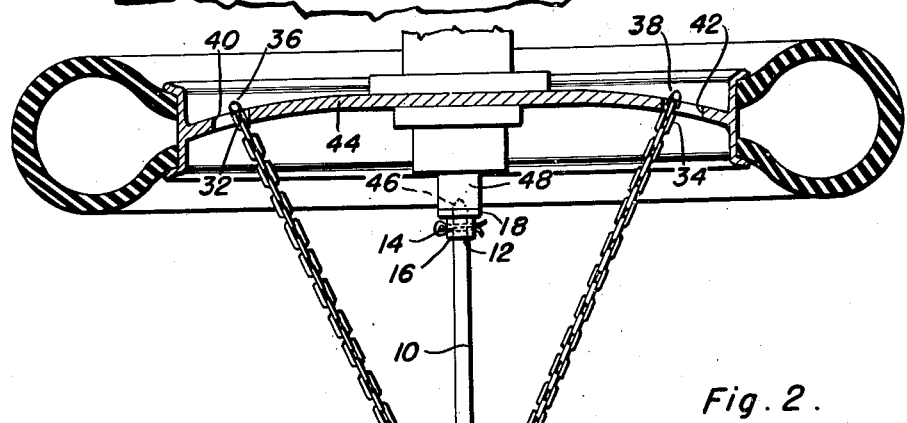
Figure 2 is a horizontal sectional view taken substantially on the plane of section line 2—2 of Figure 1, and showing the present invention in plan.
Figure 3:
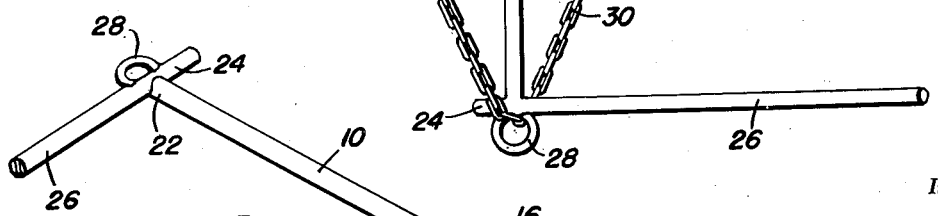
Figure 3 is a fragmentary perspective view of the present invention removed from a wheel and showing the flexible wheel engaging member removed therefrom.

Referring now to the drawings in detail, wherein for the purpose of illustration, there is disclosed a preferred embodiment of the present invention, the numeral 10 represents an axle engaging member or shaft one end 12 of which is removably secured by a cotter pin or the like 14 in a socket or sleeve 16 that is closed at its outer end by a closure plate or bearing plate 18.

Fixedly secured to the closure plate 18, is an outwardly projecting, substantially conical bearing element 20.

Integrally formed with the outer end 22 of the axle engaging member 10, is one end 24 of a lever or bar 26 that is disposed at right angles relative to the axle engaging member 10. Further, the end 24 of the lever 26 is integrally formed with an eye member or loop 28 that slidably engages a flexible element or link chain 30 the ends 32 and 34 of which support anchoring pins 36 and 38.

In practical use of the present invention, the ends 32 and 34 are extended through diametrically opposed openings 40 and 42 in a wheel 44 so that the pins 36 and 38 will bear against the inner face of the wheel 44. The bearing element 20 engages a recess or socket 46 provided in the outer end of the wheel axle 48 to retain the flexible element 30 relatively tense. As the lever 26 is rotated, the flexible element 30 will be twisted about the axle engaging member 10 and the wheel 44 will be pulled outwardly from the wheel axle 48.

In view of the foregoing description taken in conjunction with the accompanying drawings it is believed that a clear understanding of the construction, operation and advantages of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claim.

Having described the invention, what is claimed as new is:

A tool for removing a wheel from an axle, said tool comprising an elongated shaft having inner and outer end portions, an eye member at the outer end portion of said shaft, a sleeve detachably secured to the inner end portion of said shaft, a bearing plate fixed to said sleeve, a conical bearing element secured to the bearing plate and received in a recess in the outer end of the axle, an elongated flexible element trained through the eye member and having its ends received in a pair of openings in the wheel, anchoring pins carried by the ends of said flexible element resting against the inner face of the wheel, and a lever secured to the shaft for rotating the shaft to twist the flexible element about the shaft.

FLOYD HINK.

REFERENCES CITED

The following references are of record in the file of this patent:

UNITED STATES PATENTS

| Number | Name | Date |
|---|---|---|
| 250,264 | Landers | Nov. 29, 1881 |
| 499,945 | Steen | June 20, 1893 |
| 587,228 | Orton | July 27, 1897 |
| 1,457,795 | Pizzuti | June 5, 1923 |
| 1,620,211 | Jerabek | Mar. 8, 1927 |